United States Patent
Yu

(10) Patent No.: US 12,072,560 B2
(45) Date of Patent: Aug. 27, 2024

(54) DARK AREA REPAIR METHOD AND DARK AREA REPAIR DEVICE OF CURVED LIQUID CRYSTAL DISPLAY PANEL

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Liang Yu, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/599,244

(22) PCT Filed: Jul. 27, 2021

(86) PCT No.: PCT/CN2021/108552
§ 371 (c)(1),
(2) Date: Sep. 28, 2021

(87) PCT Pub. No.: WO2023/284005
PCT Pub. Date: Jan. 19, 2023

(65) Prior Publication Data
US 2024/0053626 A1    Feb. 15, 2024

(30) Foreign Application Priority Data

Jul. 15, 2021 (CN) .......................... 202110798634.6

(51) Int. Cl.
*G02F 1/1337* (2006.01)
*G02F 1/13* (2006.01)

(52) U.S. Cl.
CPC ...... *G02F 1/1309* (2013.01); *G02F 1/133761* (2021.01); *G02F 1/133773* (2021.01)

(58) Field of Classification Search
CPC .......................... G02F 1/1309; G02F 1/133773
See application file for complete search history.

(56) References Cited

U.S. PATENT DOCUMENTS

2009/0079923 A1    3/2009    Miyachi

FOREIGN PATENT DOCUMENTS

| CN | 102053398 A | 5/2011 |
| CN | 104570422 A | 4/2015 |

(Continued)

OTHER PUBLICATIONS

International Search Report in International application No. PCT/CN2021/108552, mailed on Apr. 13, 2022.

(Continued)

*Primary Examiner* — Paisley L Wilson
(74) *Attorney, Agent, or Firm* — PV IP PC; Wei Te Chung; Zhigang Ma

(57) ABSTRACT

A dark area repair method and a dark area repair device of a curved liquid crystal display panel are provided. It is concluded through a summary that, under different curvatures, there is a quantitative relationship between a dark area and a first pretilt angle and a second pretilt angle. It determines whether a difference value of the first pretilt angle and the second pretilt angle is greater than or equal to a dark area critical value, and if so, there is no dark area. It is convenient to determine whether the dark area will show in the panel in advance in an early experimental stage, which can be used to guide an improvement of the dark area.

15 Claims, 5 Drawing Sheets

(56) References Cited

FOREIGN PATENT DOCUMENTS

| CN | 109613765 A | 4/2019 | | |
|---|---|---|---|---|
| CN | 109669302 A | 4/2019 | | |
| CN | 111240100 A | 6/2020 | | |
| CN | 111552121 A | 8/2020 | | |
| CN | 112666759 A | 4/2021 | | |
| JP | 2020008677 A | 1/2020 | | |
| KR | 20160040068 A | 4/2016 | | |
| WO | WO-2016112102 A1 | * | 7/2016 | ....... G02F 1/133753 |

OTHER PUBLICATIONS

Written Opinion of the International Searching Authority in International application No. PCT/CN2021/108552, mailed on Apr. 13, 2022.
Chinese Office Action in corresponding Chinese Patent Application No. 202110798634.6 dated Feb. 24, 2022, pp. 1-8.

* cited by examiner

DARK AREA REPAIR METHOD AND DARK AREA REPAIR DEVICE OF CURVED LIQUID CRYSTAL DISPLAY PANEL

RELATED APPLICATIONS

This application is a National Phase of PCT Patent Application No. PCT/CN2021/108552 having international filing date of Jul. 27, 2021, which claims the benefit of priority of Chinese Patent Application No. 202110798634.6 filed on Jul. 15, 2021. The contents of the above applications are all incorporated by reference as if fully set forth herein in their entirety.

FIELD OF DISCLOSURE

The present disclosure relates to the field of display technologies, and in particular to a dark area repair method and a dark area repair device of a curved liquid crystal display panel.

BACKGROUND

An existing curved liquid crystal display is composite of a normal flat liquid crystal display and a curved backlight. For vertical alignment (VA) type liquid crystal display panels, obvious black areas will show on left and right sides of the panel after bending.

As shown in FIG. 1A, when a panel is in a flat state, pretilt angles of upper and lower substrates are the same. Tilting directions of liquid crystal molecules 31 on a side of a color filter substrate 1 and a side of an array substrate 2 are the same, so that brightness of different areas of the panel is the same, and no dark area is shown. As shown in FIG. 1B, when the panel is in a bent state, the upper and lower substrates are relatively displaced due to a bending difference of the upper and lower substrates. In a vertical direction, pretilt angles of the upper and lower substrates are not consistent. As a result, after the panel is powered on, the tilting directions of the liquid crystal molecules 31 on the side of the color filter substrate 1 and the side of the array substrate 2 are disordered (for example, an A region), resulting in dark stripes of pixels. Macroscopically, it appears as a dark area, which leads to uneven display brightness of the panel and lowers a display quality. After the panel is assembled, if there is a dark area shown on the panel, a repair process is more difficult and complicated, which increases a production cost. Therefore, it is particularly important to determine whether the dark area shows before the panel is assembled.

Accordingly, it is necessary to provide a dark area repair method and a dark area repair device of a curved liquid crystal display panel to solve the above technical problems.

SUMMARY OF DISCLOSURE

Embodiment of the present disclosure provide a dark area repair method and a dark area repair device of a curved liquid crystal display panel to solve the technical problems that in existing curved liquid crystal display panels, if a dark area is shown after an assembly is completed, a repair process is more difficult and complicated.

In order to solve the above problems, the technical solutions of the present disclosure are as follows.

The present disclosure provides a dark area repair method of a curved liquid crystal display panel. The curved liquid crystal display panel includes a color filter substrate, an array substrate opposite to the color filter substrate, and a liquid crystal layer disposed between the color filter substrate and the array substrate, the liquid crystal layer includes a plurality of liquid crystal molecules, and the dark area repair method includes following steps.

acquiring a preset curvature of the curved liquid crystal display panel, a first pretilt angle of the liquid crystal molecules on a side of the color filter substrate, and a second pretilt angle of the liquid crystal molecules on a side of the array substrate, wherein the first pretilt angle and the second pretilt angle are angles between the liquid crystal molecules and a vertical direction;

obtaining a dark area critical value of the curved liquid crystal display panel according to the preset curvature, the first pretilt angle, and a dark area critical value prediction policy obtained in advance;

calculating a difference value between the first pretilt angle and the second pretilt angle; and determining whether the difference value is greater than or equal to the dark area critical value according to the difference value and the dark area critical value, and if so, determining that the curved liquid crystal display panel is free from a dark area.

According to the dark area repair method of the present disclosure, before the step of obtaining the dark area critical value of the curved liquid crystal display panel according to the preset curvature, the first pretilt angle, and the dark area critical value prediction policy obtained in advance, the dark area repair method further includes:

obtaining a sample data set of a plurality of sample curved liquid crystal display panels acquired in advance, wherein the sample data set includes a plurality of sample data of the plurality of sample curved liquid crystal display panels with the preset curvature, and each of the sample data includes the first pretilt angle, the second pretilt angle, and the dark area critical value;

obtaining a dark area critical value prediction model by using the sample data set; and determining the dark area critical value prediction policy by using the dark area critical value prediction model.

According to the dark area repair method of the present disclosure, the step of obtaining the dark area critical value prediction model by using the sample data set includes:

obtaining a dark area critical value prediction formula of the curved liquid crystal display panel by performing a fitting calculation according to the plurality of sample data of the sample data set.

According to the dark area repair method of the present disclosure, the dark area critical value prediction formula is:

$$y=f(x)=p0*x^n+p1*x^{(n-1)}+p2*x^{(n-2)}+p3*x^{(n-3)}+\ldots+p(n-2)*x^2+p(n-1)*x+p5,$$

wherein n is a positive integer, p0, p1, p2, p3, p(n−2), and p(n−1) are coefficients in the formula, x is the first pretilt angle, and y is the dark area critical value.

According to the dark area repair method of the present disclosure, the step of obtaining the dark area critical value of the curved liquid crystal display panel according to the preset curvature, the first pretilt angle, and the dark area critical value prediction policy obtained in advance includes:

taking the first pretilt angle into the dark area critical value prediction formula to obtain the dark area critical value of the curved liquid crystal display panel.

According to the dark area repair method of the present disclosure, if it determines that the curved liquid crystal display panel includes the dark area, the dark area repair method further includes:

determining, according to the dark area critical value, a target difference value between the first pretilt angle and the second pretilt angle that meets a requirement of no dark area will show on the curved liquid crystal display panel; and adjusting the difference value between the first pretilt angle and the second pretilt angle to be greater than or equal to the target difference value.

According to the dark area repair method of the present disclosure, the step of adjusting the difference value between the first pretilt angle and the second pretilt angle to be greater than or equal to the target difference value includes:

keeping the first pretilt angle unchanged, and adjusting the second pretilt angle so that the difference value between the first pretilt angle and the second pretilt angle is greater than or equal to the target difference value; or keeping the second pretilt angle unchanged, and adjusting the first pretilt angle so that the difference value between the first pretilt angle and the second pretilt angle is greater than or equal to the target difference value.

According to the dark area repair method of the present disclosure, the display panel includes a first alignment film and a second alignment film, the first alignment film is disposed on a surface of the color filter substrate facing the array substrate, the second alignment film is disposed on a surface of the array substrate facing the color filter substrate, and the step of adjusting the difference value between the first pretilt angle and the second pretilt angle to be greater than or equal to the target difference value includes:

adjusting material combinations and process conditions of the first alignment film and the second alignment film to make the difference value between the first pretilt angle and the second pretilt angle greater than or equal to the target difference value.

According to the dark area repair method of the present disclosure, if the difference value is less than the dark area critical value, a degree to which the difference value deviates from the dark area critical value is positively correlated with severity of the dark area.

The present disclosure provides a dark area repair method of a curved liquid crystal display panel. The curved liquid crystal display panel includes a color filter substrate, an array substrate opposite to the color filter substrate, and a liquid crystal layer disposed between the color filter substrate and the array substrate, the liquid crystal layer includes a plurality of liquid crystal molecules, and the dark area repair method includes following steps.

acquiring a preset curvature of the curved liquid crystal display panel, a first pretilt angle of the liquid crystal molecules on a side of the color filter substrate, and a second pretilt angle of the liquid crystal molecules on a side of the array substrate;

obtaining a dark area critical value of the curved liquid crystal display panel according to the preset curvature, the first pretilt angle, and a dark area critical value prediction policy obtained in advance;

calculating a difference value between the first pretilt angle and the second pretilt angle; and determining whether the difference value is greater than or equal to the dark area critical value according to the difference value and the dark area critical value, and if so, determining that the curved liquid crystal display panel is free from a dark area.

According to the dark area repair method of the present disclosure, before the step of obtaining the dark area critical value of the curved liquid crystal display panel according to the preset curvature, the first pretilt angle, and the dark area critical value prediction policy obtained in advance, the dark area repair method further includes:

obtaining a sample data set of a plurality of sample curved liquid crystal display panels acquired in advance, wherein the sample data set includes a plurality of sample data of the plurality of sample curved liquid crystal display panels with the preset curvature, and each of the sample data includes the first pretilt angle, the second pretilt angle, and the dark area critical value;

obtaining a dark area critical value prediction model by using the sample data set; and determining the dark area critical value prediction policy by using the dark area critical value prediction model.

According to the dark area repair method of the present disclosure, the step of obtaining the dark area critical value prediction model by using the sample data set includes:

obtaining a dark area critical value prediction formula of the curved liquid crystal display panel by performing a fitting calculation according to the plurality of sample data of the sample data set.

According to the dark area repair method of the present disclosure, the dark area critical value prediction formula is:

$$y=f(x)=p0*x^n+p1*x^{(n-1)}+p2*x^{(n-2)}+p3*x^{(n-3)}+\ldots+p(n-2)*x^2+p(n-1)*x+p5,$$

wherein n is a positive integer, p0, p1, p2, p3, p(n−2), and p(n−1) are coefficients in the formula, x is the first pretilt angle, and y is the dark area critical value.

According to the dark area repair method of the present disclosure, the step of obtaining the dark area critical value of the curved liquid crystal display panel according to the preset curvature, the first pretilt angle, and the dark area critical value prediction policy obtained in advance includes:

taking the first pretilt angle into the dark area critical value prediction formula to obtain the dark area critical value of the curved liquid crystal display panel.

According to the dark area repair method of the present disclosure, if it determines that the curved liquid crystal display panel includes the dark area, the dark area repair method further includes:

determining, according to the dark area critical value, a target difference value between the first pretilt angle and the second pretilt angle that meets a requirement of no dark area will show on the curved liquid crystal display panel; and adjusting the difference value between the first pretilt angle and the second pretilt angle to be greater than or equal to the target difference value.

According to the dark area repair method of the present disclosure, the step of adjusting the difference value between the first pretilt angle and the second pretilt angle to be greater than or equal to the target difference value includes:

keeping the first pretilt angle unchanged, and adjusting the second pretilt angle so that the difference value between the first pretilt angle and the second pretilt angle is greater than or equal to the target difference value; or keeping the second pretilt angle unchanged, and adjusting the first pretilt angle so that the difference value between the first pretilt angle and the second pretilt angle is greater than or equal to the target difference value.

According to the dark area repair method of the present disclosure, the display panel includes a first alignment film and a second alignment film, the first alignment film is disposed on a surface of the color filter substrate facing the array substrate, the second alignment film is disposed on a surface of the array substrate facing the color filter substrate, and the step of adjusting the difference value between the first pretilt angle and the second pretilt angle to be greater than or equal to the target difference value includes:

adjusting material combinations and process conditions of the first alignment film and the second alignment film to make the difference value between the first pretilt angle and the second pretilt angle greater than or equal to the target difference value.

According to the dark area repair method of the present disclosure, if the difference value is less than the dark area critical value, a degree to which the difference value deviates from the dark area critical value is positively correlated with severity of the dark area.

The present disclosure provides a dark area repair device of a curved liquid crystal display panel. The curved liquid crystal display panel includes a color filter substrate, an array substrate opposite to the color filter substrate, and a liquid crystal layer disposed between the color filter substrate and the array substrate, the liquid crystal layer includes a plurality of liquid crystal molecules, and the dark area repair device includes:

an acquiring unit configured to acquire a preset curvature of the curved liquid crystal display panel, a first pretilt angle of the liquid crystal molecules on a side of the color filter substrate, and a second pretilt angle of the liquid crystal molecules on a side of the array substrate;

a predicting unit configured to obtain a dark area critical value of the curved liquid crystal display panel according to the preset curvature, the first pretilt angle, and a dark area critical value prediction policy obtained in advance;

a calculating unit configured to calculate a difference value between the first pretilt angle and the second pretilt angle; and a determining unit configured to determine whether the difference value is greater than or equal to the dark area critical value according to the difference value and the dark area critical value, and if so, to determine that the curved liquid crystal display panel is free from a dark area.

According to the dark area repair device of the present disclosure, the dark area repair device further includes an adjusting unit. In response to the determining unit determines that the curved liquid crystal display panel includes the dark area, the adjusting unit is configured to determine, according to the dark area critical value, a target difference value between the first pretilt angle and the second pretilt angle that meets a requirement of no dark area will show on the curved liquid crystal display panel, and the target difference value is greater than or equal to the dark area critical value.

Advantages of the present disclosure are as follows. In the dark area repair method and the dark area repair device of the curved liquid crystal display panel of present disclosure, it is concluded through a summary that, under different curvatures, there is a quantitative relationship between the dark area and the first pretilt angle of the liquid crystal molecules on the side of the color filter substrate and the second pretilt angle of the liquid crystal molecules on the side of the array substrate. It is convenient to determine whether the dark area will show in the curved liquid crystal display panel in advance in an early experimental stage, which can be used to guide an improvement of the dark area. It prevents that the dark area can be determined only after the curved liquid crystal display panel is assembled in a conventional design. It reduces the number of experiments and time, optimizes a product design process, and reduces design costs.

BRIEF DESCRIPTION OF DRAWINGS

In order to explain technical solutions of embodiments or the prior art more clearly, the following will briefly introduce drawings that need to be used in the description of the embodiments or the prior art. Obviously, the drawings in the following description are only some embodiments of the application, for those of ordinary skill in the art, other drawings can be obtained based on these drawings without creative efforts.

DETAILED DESCRIPTION

Figure 1A:
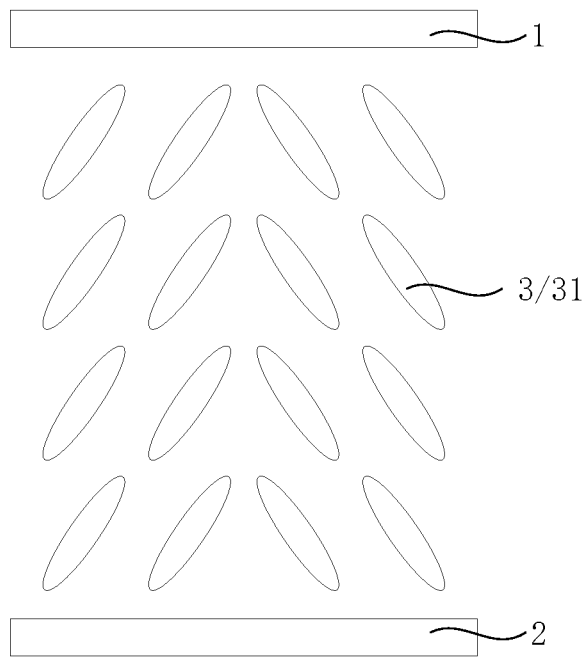
FIG. 1A is a schematic diagram of a curved liquid crystal display panel in a planar state in the prior art.
Figure 1B:
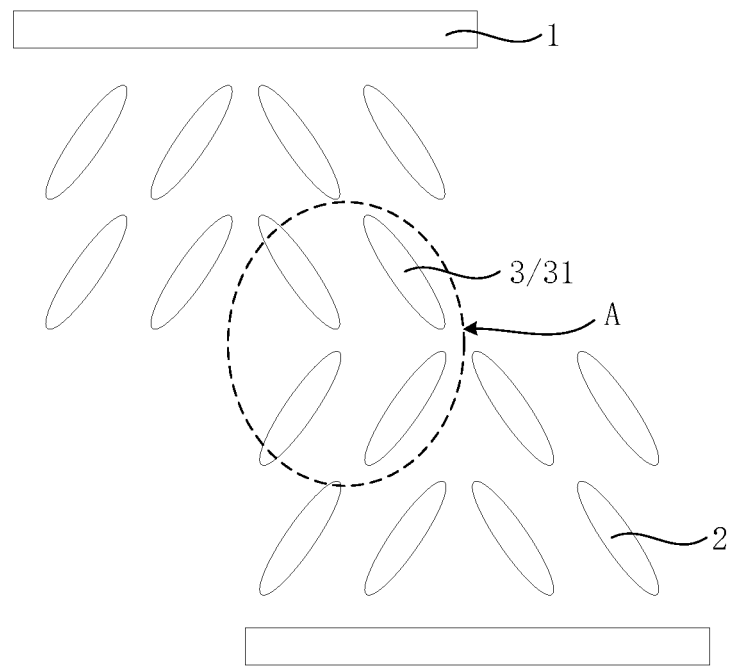
FIG. 1B is a schematic diagram of the curved liquid crystal display panel in a bent state in the prior art.

The technical solutions in the embodiments of the present disclosure will be clearly and completely described below in conjunction with the drawings in the embodiments of the present disclosure. Obviously, the described embodiments are only a part of the embodiments of the present disclosure, rather than all of the embodiments. Based on the embodiments in the present disclosure, all other embodiments obtained by those skilled in the art without creative efforts shall fall within the scope of protection of the present disclosure. In addition, it should be understood that the specific embodiments described herein are only used to illustrate and explain the present disclosure, and are not used to limit the present disclosure. In the present disclosure, if no explanation is made to the contrary, orientation terms, such as "upper" and "lower", usually refer to upper and lower sides of a device in actual use or working state, and specifically refer to the directions in the drawings. Also, "inner" and "outer" refer to an outline of the device.

The embodiments of the present application provide a dark area repair method and a dark area repair device of a curved liquid crystal display panel. Detailed descriptions are given below.

Figure 2:
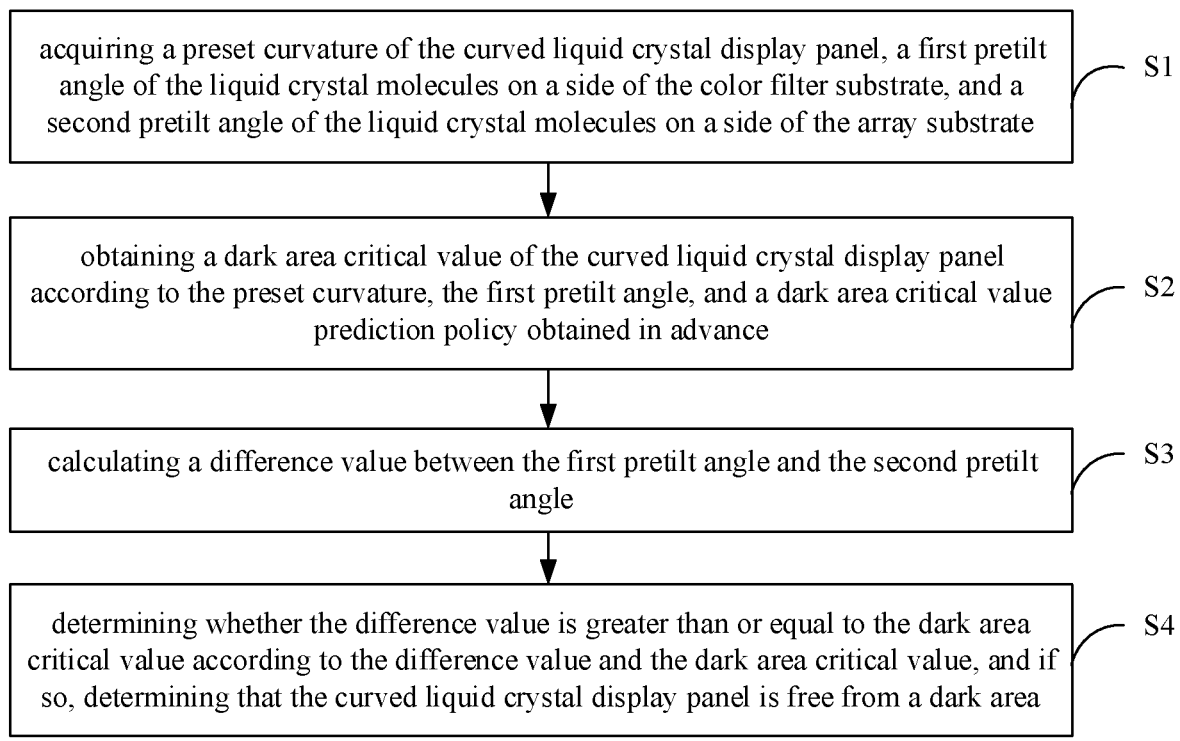
FIG. 2 is a flowchart of a dark area repair method of a curved liquid crystal display panel of an embodiment of the present disclosure.
Figure 3:
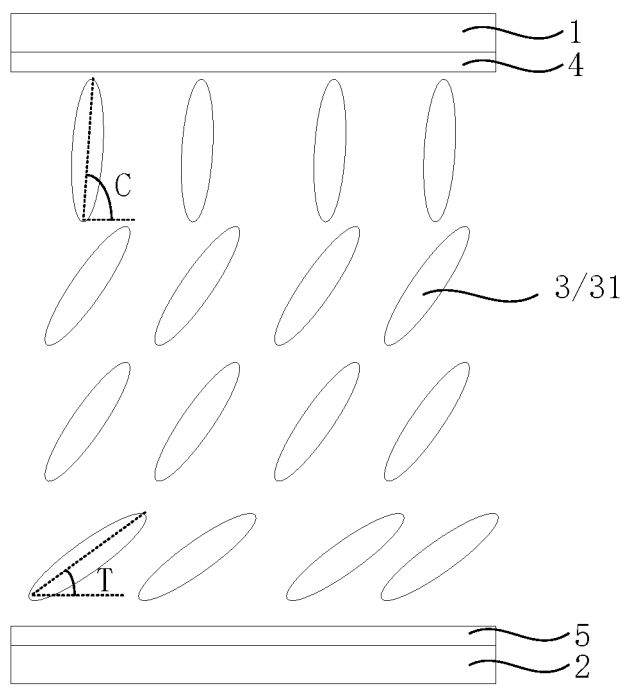
FIG. 3 is a schematic diagram of a curved liquid crystal display panel of an embodiment of the present disclosure.

Referring to FIG. 2 and FIG. 3, FIG. 2 is a flowchart of a dark area repair method of a curved liquid crystal display panel of an embodiment of the present disclosure, and FIG. 3 is a schematic diagram of a curved liquid crystal display panel of an embodiment of the present disclosure.

The dark area repair method of the embodiment of the present disclosure is applied to a curved liquid crystal display panel. The curved liquid crystal display panel includes a color filter substrate 1, an array substrate 2 opposite to the color filter substrate 1, and a liquid crystal layer 3 disposed between the color filter substrate 1 and the array substrate 2. The liquid crystal layer includes a plurality of liquid crystal molecules 31.

In one embodiment of the present disclosure, the dark area repair method includes the following steps:
- S1, a preset curvature of the curved liquid crystal display panel, a first pretilt angle of the liquid crystal molecules on a side of the color filter substrate, and a second pretilt angle of the liquid crystal molecules on a side of the array substrate are acquired.
- S2, a dark area critical value of the curved liquid crystal display panel is obtained according to the preset curvature, the first pretilt angle, and a dark area critical value prediction policy obtained in advance.
- S3, a difference value between the first pretilt angle and the second pretilt angle is calculated.
- S4, it determines that whether the difference value is greater than or equal to the dark area critical value according to the difference value and the dark area critical value, and if so, it determines that the curved liquid crystal display panel is free from a dark area.

In the dark area repair method of the curved liquid crystal display panel of the embodiment of the present disclosure, it is concluded through a summary that, under different curvatures, there is a quantitative relationship between the dark area and the first pretilt angle C of the liquid crystal molecules 31 on the side of the color filter substrate 1 and the second pretilt angle T of the liquid crystal molecules 31 on the side of the array substrate 2. It is convenient to determine whether the dark area will show in the curved liquid crystal display panel in advance in an early experimental stage. It prevents that the dark area can be determined only after the curved liquid crystal display panel is assembled in a conventional design. It reduces the number of experiments and time, optimizes a product design process, and reduces design costs.

Specifically, the preset curvature is an overall bending curvature of the curved liquid crystal display panel. That is, a radius of a curved arc. For example, the preset curvature may be R1500, R1000, or R800. The smaller the value, the greater the curvature of the curved liquid crystal display panel.

Specifically, the curved liquid crystal display panel further includes a first alignment film 4 and a second alignment film 5. The first alignment film 4 is arranged on a surface of the color filter substrate 1 facing the array substrate 2. The second alignment film 5 is arranged on a surface of the array substrate 2 facing the color filter substrate 1. The values of the first pretilt angle C and the second pretilt angle T are determined based on factors such as orientations of the first alignment film 4 and the second alignment film 5, material combinations, process conditions, etc.

It should be noted that the first pretilt angle C refers to a part of the liquid crystal molecules 31 on the first alignment film 4. The second pretilt angle T refers to a part of the liquid crystal molecules 31 on the second alignment film 5. The first pretilt angle C and the second pretilt angle T may be angles between the liquid crystal molecules and a vertical direction, or may be angles between the liquid crystal molecules 31 and a horizontal direction, and the embodiment of the present disclosure is not limited to this.

Specifically, by studying and analyzing a formation mechanism of the dark area on the curved surface and difference value ($\Delta T - C$) data between the first pretilt angle C and the second pretilt angle, it can be known that by adjusting the manufacturing process and the material combinations, the difference value between the first pretilt angle C and the second pretilt angle T can be made different (that is, the first pretilt angle C and the second pretilt angle T are the angles between the liquid crystal molecules and the vertical direction, and the second pretilt angle T is greater than the first pretilt angle C; alternatively, the first pretilt angle C and the second pretilt angle T are the angles between the liquid crystal molecules and the horizontal direction, and the second pretilt angle T is smaller than the first pretilt angle C.), which can effectively improve the dark area. Therefore, the dark area is directly affected by the value of the first pretilt angle and the difference value ($\Delta T - C$) between the first pretilt angle and the second pretilt angle. For a certain first pretilt angle C, the difference value ($\Delta T - C$) between the first pretilt angle C and the second pretilt angle T must be greater than or equal to the dark area critical value to ensure that the dark area is OK (that is, there is no dark area). Moreover, if the difference value ($\Delta T - C$) between the first pretilt angle C and the second pretilt angle T is less than the dark area critical value, the dark area is NG (that is, there is a dark area). The degree to which the difference value ($\Delta T - C$) between the first pretilt angle C and the second pretilt angle T deviates from the dark area critical value is positively correlated with the severity of the dark area. That is, the greater the difference value ($\Delta T - C$) between the first pretilt angle C and the second pretilt angle T deviates from the dark area critical value, the more serious the dark area is.

Therefore, the embodiment of present disclosure uses the difference value ($\Delta T - C$) between the first pretilt angle C and the second pretilt angle T to determine a magnitude relationship between the difference value ($\Delta T - C$) and the dark area critical value, and then determine whether there is a dark area will show on the curved liquid crystal display panel. If it determines that the difference value ($\Delta T - C$) between the first pretilt angle C and the second pretilt angle T is greater than or equal to the dark area critical value, there is no dark area will show on the curved liquid crystal display panel. If it determines that the difference value ($\Delta T - C$) between the first pretilt angle C and the second pretilt angle T is less than the dark area critical value, the dark area will show on the curved liquid crystal display panel.

Figure 4:
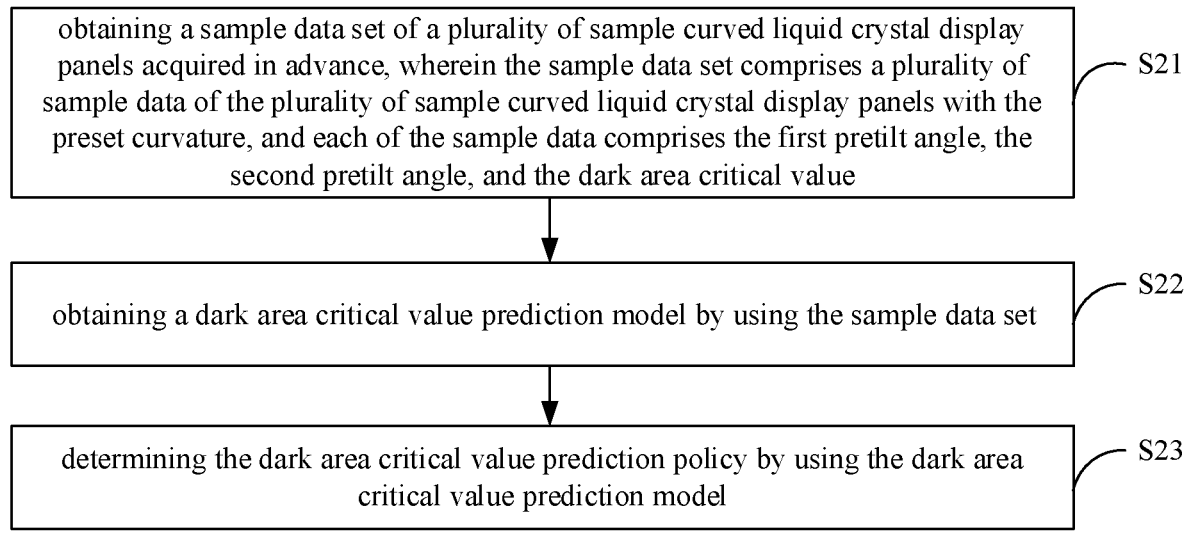
FIG. 4 is a flowchart of a dark area repair method of a curved liquid crystal display panel of another embodiment of the present disclosure based on the dark area repair method of FIG. 2.

Furthermore, in a specific embodiment of the present disclosure, refer to FIG. 4, which is a flowchart of a dark area repair method of a curved liquid crystal display panel of another embodiment of the present disclosure based on the dark area repair method of FIG. 2.

Before the step of obtaining the dark area critical value of the curved liquid crystal display panel according to the preset curvature, the first pretilt angle C, and the dark area critical value prediction policy obtained in advance, the dark area repair method further includes:
- S21, a sample data set of a plurality of sample curved liquid crystal display panels acquired in advance is obtained. The sample data set includes a plurality of sample data of the plurality of sample curved liquid crystal display panels with the preset curvature, and each of the sample data includes the first pretilt angle, the second pretilt angle, and the dark area critical value.

S22, a dark area critical value prediction model is obtained by using the sample data set.

S23, the dark area critical value prediction policy is determined by using the dark area critical value prediction model.

Specifically, the sample data set of the plurality of sample curved liquid crystal display panels are obtained. The sample data set includes a plurality of sample data of the sample curved liquid crystal display panels under the preset curvature. Each of the sample data includes the first pretilt angle C, the second pretilt angle T, and the corresponding dark area critical value.

After obtaining the sample data set, a simulation software, such as Icepak, is employed to establish a mathematical model of the curved liquid crystal display panel. After obtaining the mathematical model of the curved liquid crystal display panel, the mathematical model can be used to determine the dark area critical value prediction policy of the curved liquid crystal display panel.

Furthermore, after obtaining the sample data set and the dark area critical value prediction policy, a fitting calculation is performed on the first pretilt angle C and the corresponding dark area critical value to obtain the dark area critical value prediction formula.

In the foregoing embodiment, the dark area critical value prediction formula obtained by fitting may be:

$$y=f(x)=p0*xn+p1*x(n-1)+p2*x(n-2)+p3*x(n-3)+\ldots+p(n-2)*x2+p(n-1)*x+p5;$$

n is a positive integer, p0, p1, p2, p3, p(n−2), and p(n−1) are coefficients in the formula, x is the first pretilt angle, and y is the dark area critical value.

After obtaining the dark area critical value prediction formula, to predict the dark area critical value corresponding to the first pretilt angle C, it is only necessary to obtain the preset curvature and the first pretilt angle C of the curved liquid crystal display panel. The first pretilt angle C is taken into the aforementioned dark area critical value prediction formula to calculate a specific predicted value of the dark area critical value. In the early experimental stage, this theoretical formula is used to determine whether there is a dark area, which can facilitate to determine whether a certain material, the material combinations, or the process conditions can meet the requirements of the dark area. It prevents that the dark area can be determined only after the curved liquid crystal display panel is assembled in a conventional design. It reduces the number of experiments and time, optimizes a product design process, and reduces design costs.

Figure 5:
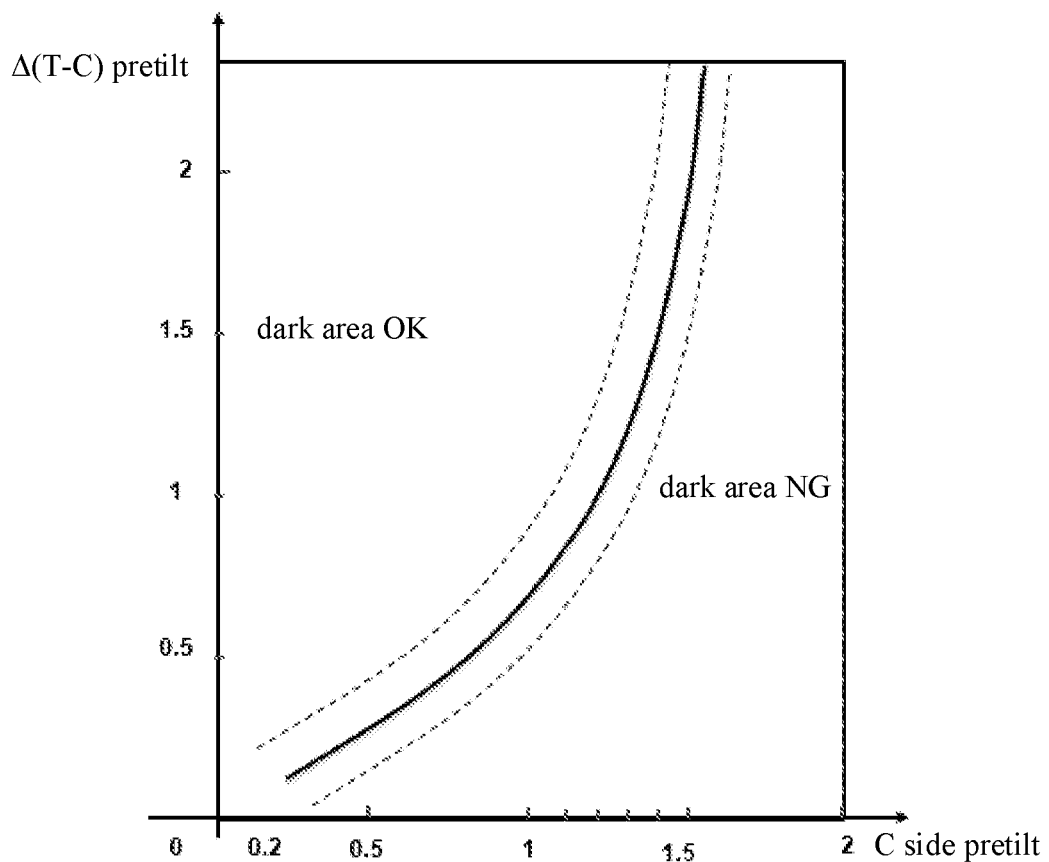
FIG. 5 is a graph showing a relationship between a dark area and pretilt angles of a curved liquid crystal display panel with a curvature of R1500 of an embodiment of the present disclosure.
Figure 6:
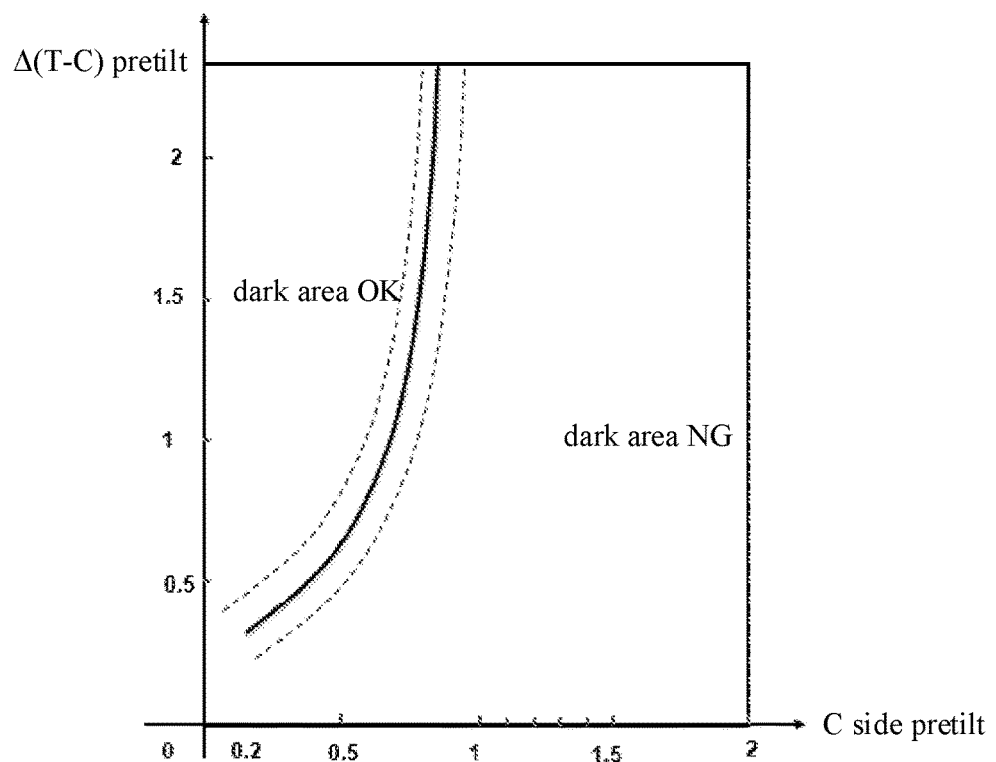
FIG. 6 is a graph showing a relationship between a dark area and pretilt angles of a curved liquid crystal display panel with a curvature of R1000 of an embodiment of the present disclosure.
Figure 7:
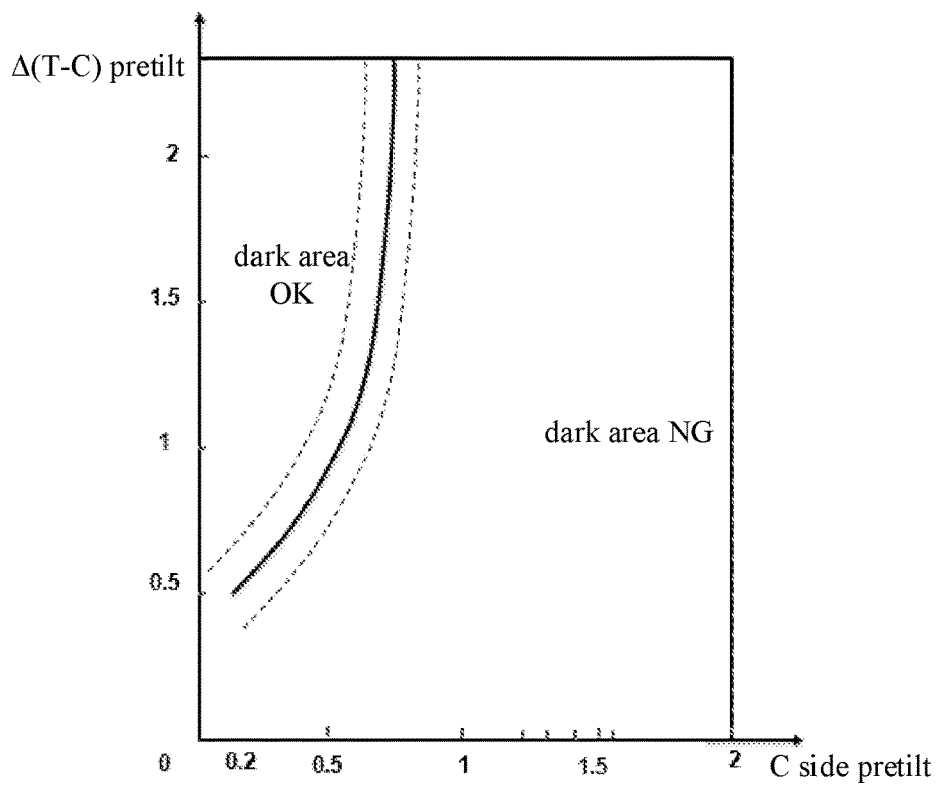
FIG. 7 is a graph showing a relationship between a dark area and pretilt angles of a curved liquid crystal display panel with a curvature of R800 of an embodiment of the present disclosure.

Refer to FIG. 5 to FIG. 7, which are graphs showing relationships between a dark area and pretilt angles of curved liquid crystal display panels with different curvatures. For the curved liquid crystal display panels with different curvatures, the dark area critical value prediction formulas are similar but there are certain differences. The following examples will be described in detail one by one.

As shown in FIG. 5, which is a graph showing a relationship between a dark area and pretilt angles of a curved liquid crystal display panel with a curvature of R1500 of an embodiment of the present disclosure. Taking the curved liquid crystal display panel with the curvature R1500 as an example, through the simulation analysis and fitting of experimental data, the above dark area critical value prediction formula is obtained as:

$$y=f(x)=0.9979x4-1.4696x3+1.3868x2-0.1549x+0.2492$$

As shown in FIG. 6, which is a graph showing a relationship between a dark area and pretilt angles of a curved liquid crystal display panel with a curvature of R1000 of an embodiment of the present disclosure. Taking the curved liquid crystal display panel with the curvature R1000 as an example, through the simulation analysis and fitting of experimental data, the above dark area critical value prediction formula is obtained as:

$$y=f(x)=250.01x5-605.84x4+563.06x3-247.43x2+51.942x-3.792$$

As shown in FIG. 7, which is a graph showing a relationship between a dark area and pretilt angles of a curved liquid crystal display panel with a curvature of R800 of an embodiment of the present disclosure. Taking the curved liquid crystal display panel with the curvature R800 as an example, through the simulation analysis and fitting of experimental data, the above dark area critical value prediction formula is obtained as:

$$y=f(x)=417.54x5-615.28x4+347.88x3-90.302x2+11.248x+0.0574$$

Specifically, function curves of the above formulas can be substituted into a coordinate system, and the function curves of the above formulas are represented by black solid lines in FIG. 5 to FIG. 7. The abscissa of the coordinate system is the first pretilt angle, and the ordinate is the difference value (ΔT−C) between the first pretilt angle C and the second pretilt angle T. This coordinate system can be used to determine whether there is the dark area. Specifically, if (ΔT−C)≥y, the dark area is OK. If (ΔT−C)<y, the dark area is NG. Therefore, in the early experimental stage, it can facilitate to determine whether a certain material, the material combinations, or the process conditions can meet the requirements of the dark area. It prevents that the dark area can be determined only after the curved liquid crystal display panel is assembled in a conventional design. It reduces the number of experiments and time, optimizes a product design process, and reduces design costs.

It should be noted that for different backlight types, different display panel designs, different polarizers, and other different factors, the dark area critical value prediction formula has certain differences. This formula can be modified according to actual situations.

Figure 8:
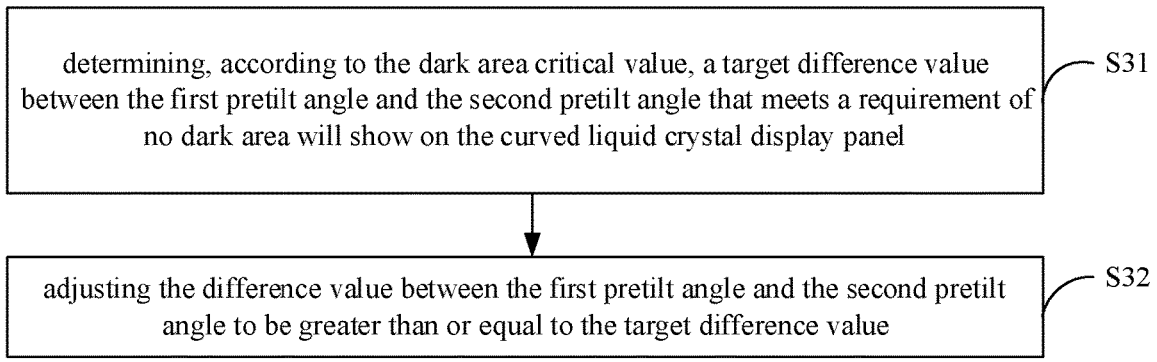
FIG. 8 is a flowchart of a dark area repair method of a curved liquid crystal display panel of another embodiment of the present disclosure based on the dark area repair method of FIG. 2.

Furthermore, in a specific embodiment of the present disclosure, referring to FIG. 8, which is a flowchart of a dark area repair method of a curved liquid crystal display panel of another embodiment of the present disclosure based on the dark area repair method of FIG. 2.

If it determines that the curved liquid crystal display panel includes the dark area, the dark area repair method further includes:

S31, according to the dark area critical value, a target difference value between the first pretilt angle and the second pretilt angle that meets a requirement of no dark area will show on the curved liquid crystal display panel is determined.

S32, the difference value between the first pretilt angle and the second pretilt angle is adjusted to be greater than or equal to the target difference value.

Specifically, if it determines that the curved liquid crystal display panel has the dark area, the difference value (ΔT−C) of the first pretilt angle C and the second pretilt angle T can be adjusted to be greater than or equal to the target difference value, so that there is no dark area will show on the curved liquid crystal display panel after adjustment.

Furthermore, on the basis of the foregoing embodiment, the step of adjusting the difference value of the first pretilt angle and the second pretilt angle to be greater than or equal to the target difference value includes:

The first pretilt angle is kept unchanged, and the second pretilt angle is adjusted to obtain the target difference value.

Alternatively, the second pretilt angle is kept unchanged, and the first pretilt angle is adjusted to obtain the difference value between the first pretilt angle and the second pretilt angle being greater than or equal to the target difference value.

It can be understood that since the dark area is directly affected by the value of the first pretilt angle C and the difference value ($\Delta T-C$) between the first pretilt angle C and the second pretilt angle T, the first pretilt angle C can be kept at a constant value in the embodiment of the present disclosure. By adjusting the value of the second pretilt angle T to change the difference value ($\Delta T-C$) of the first pretilt angle C and the second pretilt angle T to meet the reequipments, the dark area can be effectively prevented. Alternatively, the second pretilt angle T is kept at a constant value. By adjusting the value of the first pretilt angle C to change the difference value ($\Delta T-C$) of the first pretilt angle C and the second pretilt angle T to meet the reequipments, the dark area can be effectively prevented.

Specifically, the material combinations and the process conditions of the first alignment film 4 and the second alignment film 5 can be adjusted to make the difference value of the first pretilt angle C and the second pretilt angle T being greater than or equal to the target difference value. Thus, it can effectively improve the dark area, and the method is simple and easy to implement, which is conducive to industrialization. The dark area repair method of the embodiments of the present disclosure provides a clear direction for the development and design of curved liquid crystal display panels with different curvatures, and provides a reliable theoretical basis for the adjustment of first pretilt angle C and second pretilt angle T. It has guiding significance in the process of panel development and design, material selection, process adjustment, etc.

In the foregoing embodiments, the description of each embodiment has its own focus. For a part that is not described in detail in one embodiment, refer to the detailed description of other embodiments above, and details are not repeated here.

The present disclosure also provides a dark area repair device of a curved liquid crystal display panel. The curved liquid crystal display panel includes a color filter substrate, an array substrate opposite to the color filter substrate, and a liquid crystal layer arranged between the color filter substrate and the array substrate. The liquid crystal layer includes a plurality of liquid crystal molecules.

Figure 9:
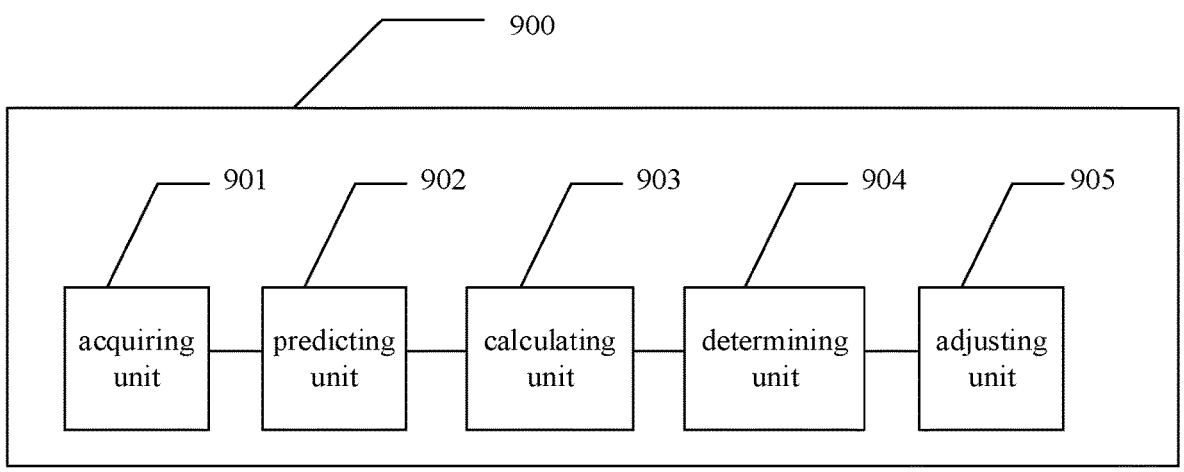
FIG. 9 is a schematic diagram of a dark area repair device of an embodiment of the present disclosure.

As shown in FIG. 9, which is a schematic diagram of a dark area repair device of an embodiment of the present disclosure. The dark area repair device 900 of the embodiment of the present disclosure includes an acquiring unit 901, a predicting unit 902, a calculating unit 903, and a determining unit 904.

The acquiring unit 901 is configured to acquire a preset curvature of the curved liquid crystal display panel, a first pretilt angle of the liquid crystal molecules on a side of the color filter substrate, and a second pretilt angle of the liquid crystal molecules on a side of the array substrate.

The predicting unit 902 is configured to obtain a dark area critical value of the curved liquid crystal display panel according to the preset curvature, the first pretilt angle, and a dark area critical value prediction policy obtained in advance.

The calculating unit 903 is configured to calculate a difference value between the first pretilt angle and the second pretilt angle.

The determining unit 904 is configured to determine whether the difference value is greater than or equal to the dark area critical value according to the difference value and the dark area critical value, and if so, to determine that the curved liquid crystal display panel is free from a dark area.

Furthermore, in some embodiments of the present disclosure, the dark area repair device of the embodiments of the present disclosure further includes an adjusting unit 905, and the adjusting unit 905 is specifically used for:

In response to the determining unit 904 determines that the curved liquid crystal display panel includes the dark area, the adjusting unit 905 is configured to determine, according to the dark area critical value, a target difference value between the first pretilt angle and the second pretilt angle that meets a requirement of no dark area will show on the curved liquid crystal display panel, and the target difference value is greater than or equal to the dark area critical value.

In the dark area repair device of the embodiment of present disclosure, it is concluded through a summary that, under different curvatures, there is a quantitative relationship between the dark area and the first pretilt angle of the liquid crystal molecules on the side of the color filter substrate and the second pretilt angle of the liquid crystal molecules on the side of the array substrate. It is convenient to determine whether the dark area will show in the curved liquid crystal display panel in advance in an early experimental stage. It prevents that the dark area can be determined only after the curved liquid crystal display panel is assembled in a conventional design. It reduces the number of experiments and time, optimizes a product design process, and reduces design costs.

A person of ordinary skill in the art can understand that all or part of the steps in the various methods of the foregoing embodiments may be completed by instructions, or by instructions to control related hardware. The instructions can be stored in a computer-readable storage medium, and loaded and executed by a processor.

Therefore, an embodiment of the present disclosure provides a storage medium. The storage medium may include: read only memory (ROM), random access memory (RAM), magnetic disk, optical disk, etc. A plurality of instructions are stored in the storage medium. The instruction can be loaded by a processor to execute the steps in any dark area repair methods of the embodiments of the present disclosure. For example, the instruction can perform the following steps:

acquiring a preset curvature of the curved liquid crystal display panel, a first pretilt angle of the liquid crystal molecules on a side of the color filter substrate, and a second pretilt angle of the liquid crystal molecules on a side of the array substrate;

obtaining a dark area critical value of the curved liquid crystal display panel according to the preset curvature, the first pretilt angle, and a dark area critical value prediction policy obtained in advance;

calculating a difference value between the first pretilt angle and the second pretilt angle; and determining whether the difference value is greater than or equal to the dark area critical value according to the difference value and the dark area critical value, and if so, determining that the curved liquid crystal display panel is free from a dark area.

In the specific implementation, each of the above units or structures may be implemented as a separate entity, or may be any combination, and implemented as the same entity or a plurality of entities. The specific implementation of the above units or structures refer to the previous method embodiment and will not be described repeatedly.

Specific implementation of the above operation can refer to the above embodiments and will not be described repeatedly herein.

Advantages are as follows. In the dark area repair method and the dark area repair device of the curved liquid crystal display panel of present disclosure, it is concluded through a summary that, under different curvatures, there is a quantitative relationship between the dark area and the first pretilt angle of the liquid crystal molecules on the side of the color filter substrate and the second pretilt angle of the liquid crystal molecules on the side of the array substrate. It is convenient to determine whether the dark area will show in the curved liquid crystal display panel in advance in an early experimental stage, which can be used to guide an improvement of the dark area. It prevents that the dark area can be determined only after the curved liquid crystal display panel is assembled in a conventional design. It reduces the number of experiments and time, optimizes a product design process, and reduces design costs.

In summary, although the present disclosure has been disclosed as above in preferred embodiments, the above preferred embodiments are not intended to limit the present disclosure. Those of ordinary skill in the art can make various changes and modifications without departing from the spirit and scope of the present disclosure. Therefore, the protection scope of the present disclosure is subject to the scope defined by the claims.

What is claimed is:

1. A dark area repair method of a curved liquid crystal display panel, wherein the curved liquid crystal display panel comprises a color filter substrate, an array substrate opposite to the color filter substrate, and a liquid crystal layer disposed between the color filter substrate and the array substrate, the liquid crystal layer comprises a plurality of liquid crystal molecules, and the dark area repair method comprise steps of:

acquiring a preset curvature of the curved liquid crystal display panel, a first pretilt angle of the liquid crystal molecules on a side of the color filter substrate, and a second pretilt angle of the liquid crystal molecules on a side of the array substrate, wherein the first pretilt angle and the second pretilt angle are angles between the liquid crystal molecules and a vertical direction, and the first pretilt angle and the second pretilt angle are different from each other;

obtaining a plurality of sample data of a plurality of sample curved liquid crystal display panels acquired in advance, wherein the sample data comprise sample first pretilt angles, sample second pretilt angles, and sample dark area critical values of the plurality of sample curved liquid crystal display panels;

obtaining a dark area critical value prediction formula using the plurality of sample data, taking the first pretilt angle into the dark area critical value prediction formula to obtain a dark area critical value of the curved liquid crystal display panel;

calculating a difference value between the first pretilt angle and the second pretilt angle; and determining whether the difference value is greater than or equal to the dark area critical value, and if the difference value is less than the dark area critical value, the difference value is adjusted to be greater than or equal to the dark area critical value to eliminate a dark area to be shown on the curved liquid crystal display panel.

2. The dark area repair method according to claim 1, wherein the step of obtaining the plurality of sample data of the plurality of sample curved liquid crystal display panels acquired in advance comprises:

obtaining a sample data set of the plurality of sample curved liquid crystal display panels acquired in advance, wherein the sample data set comprises the plurality of sample data of the plurality of sample curved liquid crystal display panels with corresponding preset curvature; and the step of obtaining the dark area critical value prediction formula comprises obtaining a dark area critical value prediction model by using the sample data set; and determining the dark area critical value prediction formula by using the dark area critical value prediction model.

3. The dark area repair method according to claim 2, wherein the step of obtaining the dark area critical value prediction model by using the sample data set comprises:

obtaining the dark area critical value prediction formula of the curved liquid crystal display panel by performing a fitting calculation according to the plurality of sample data of the sample data set.

4. The dark area repair method according to claim 1, wherein if the curved liquid crystal display panel is determined to comprise the dark area, the dark area repair method further comprises:

determining, according to the dark area critical value, a target difference value between the first pretilt angle and the second pretilt angle that meets a requirement that no dark area will show on the curved liquid crystal display panel; and adjusting the difference value between the first pretilt angle and the second pretilt angle to be greater than or equal to the target difference value.

5. The dark area repair method according to claim 4, wherein the step of adjusting the difference value between the first pretilt angle and the second pretilt angle to be greater than or equal to the target difference value comprises:

keeping the first pretilt angle unchanged, and adjusting the second pretilt angle so that the difference value between the first pretilt angle and the second pretilt angle is greater than or equal to the target difference value; or keeping the second pretilt angle unchanged, and adjusting the first pretilt angle so that the difference value between the first pretilt angle and the second pretilt angle is greater than or equal to the target difference value.

6. The dark area repair method according to claim 4, wherein the display panel comprises a first alignment film and a second alignment film, the first alignment film is disposed on a surface of the color filter substrate facing the array substrate, the second alignment film is disposed on a surface of the array substrate facing the color filter substrate, and the step of adjusting the difference value between the first pretilt angle and the second pretilt angle to be greater than or equal to the target difference value comprises:
adjusting material combinations and process conditions of the first alignment film and the second alignment film to make the difference value between the first pretilt angle and the second pretilt angle greater than or equal to the target difference value.

7. The dark area repair method according to claim 1, wherein if the difference value is less than the dark area critical value, a degree to which the difference value deviates from the dark area critical value is positively correlated with severity of the dark area.

8. A dark area repair method of a curved liquid crystal display panel, wherein the curved liquid crystal display panel comprises a color filter substrate, an array substrate opposite to the color filter substrate, and a liquid crystal layer disposed between the color filter substrate and the array substrate, the liquid crystal layer comprises a plurality of liquid crystal molecules, and the dark area repair method comprises steps of:
acquiring a preset curvature of the curved liquid crystal display panel, a first pretilt angle of the liquid crystal molecules on a side of the color filter substrate, and a second pretilt angle of the liquid crystal molecules on a side of the array substrate, and the first pretilt angle and the second pretilt angle are different from each other;
obtaining a plurality of sample data of a plurality of sample curved liquid crystal display panels acquired in advance, wherein the sample data comprise sample first pretilt angles, sample second pretilt angles, and sample dark area critical values of the plurality of sample curved liquid crystal display panels;
obtaining a dark area critical value prediction formula using the plurality of sample data, taking the first pretilt angle into the dark area critical value prediction formula to obtain a dark area critical value of the curved liquid crystal display panel;
calculating a difference value between the first pretilt angle and the second pretilt angle; and
determining whether the difference value is greater than or equal to the dark area critical value according to the difference value and the dark area critical value, and if the difference value is less than the dark area critical value, the difference value is adjusted to be greater than or equal to the dark area critical value to eliminate a dark area to be shown on the curved liquid crystal display panel.

9. The dark area repair method according to claim 8, wherein the step of obtaining the plurality of sample data of the plurality of sample curved liquid crystal display panels acquired in advance comprises:
obtaining a sample data set of the plurality of sample curved liquid crystal display panels acquired in advance, wherein the sample data set comprises the plurality of sample data of the plurality of sample curved liquid crystal display panels with corresponding preset curvature; and
the step of obtaining the dark area critical value prediction formula comprises obtaining a dark area critical value prediction model by using the sample data set; and
determining the dark area critical value prediction formula by using the dark area critical value prediction model.

10. The dark area repair method according to claim 9, wherein the step of obtaining the dark area critical value prediction model by using the sample data set comprises:
obtaining the dark area critical value prediction formula of the curved liquid crystal display panel by performing a fitting calculation according to the plurality of sample data of the sample data set.

11. The dark area repair method according to claim 8, wherein if the curved liquid crystal display panel is determined to comprise the dark area, the dark area repair method further comprises:
determining, according to the dark area critical value, a target difference value between the first pretilt angle and the second pretilt angle that meets a requirement of no dark area will show on the curved liquid crystal display panel; and
adjusting the difference value between the first pretilt angle and the second pretilt angle to be greater than or equal to the target difference value.

12. The dark area repair method according to claim 11, wherein the step of adjusting the difference value between the first pretilt angle and the second pretilt angle to be greater than or equal to the target difference value comprises:
keeping the first pretilt angle unchanged, and adjusting the second pretilt angle so that the difference value between the first pretilt angle and the second pretilt angle is greater than or equal to the target difference value; or
keeping the second pretilt angle unchanged, and adjusting the first pretilt angle so that the difference value between the first pretilt angle and the second pretilt angle is greater than or equal to the target difference value.

13. The dark area repair method according to claim 11, wherein the display panel comprises a first alignment film and a second alignment film, the first alignment film is disposed on a surface of the color filter substrate facing the array substrate, the second alignment film is disposed on a surface of the array substrate facing the color filter substrate, and the step of adjusting the difference value between the first pretilt angle and the second pretilt angle to be greater than or equal to the target difference value comprises:
adjusting material combinations and process conditions of the first alignment film and the second alignment film to make the difference value between the first pretilt angle and the second pretilt angle greater than or equal to the target difference value.

14. The dark area repair method according to claim 8, wherein if the difference value is less than the dark area critical value, a degree to which the difference value deviates from the dark area critical value is positively correlated with severity of the dark area.

15. A dark area repair device of a curved liquid crystal display panel, wherein the curved liquid crystal display panel comprises a color filter substrate, an array substrate opposite to the color filter substrate, and a liquid crystal layer disposed between the color filter substrate and the array substrate, the liquid crystal layer comprises a plurality of liquid crystal molecules, and the dark area repair device comprises:
a storage medium configured to store a plurality of instructions, the plurality of instructions comprising:
acquiring a preset curvature of the curved liquid crystal display panel, a first pretilt angle of the liquid crystal molecules on a side of the color filter substrate, and a second pretilt angle of the liquid crystal molecules on a side of the array substrate, wherein the first pretilt angle and the second pretilt angle are different from each other;

obtaining a plurality of sample data of a plurality of sample curved liquid crystal display panels acquired in advance, wherein the sample data comprise sample first pretilt angles, sample second pretilt angles, and sample dark area critical values of the plurality of sample curved liquid crystal display panels;

obtaining a dark area critical value prediction formula using the plurality of sample data, taking the first pretilt angle into the dark area critical value prediction formula to obtain a dark area critical value of the curved liquid crystal display panel;

calculating a difference value between the first pretilt angle and the second pretilt angle; and determining whether the difference value is greater than or equal to the dark area critical value according to the difference value and the dark area critical value, and if the difference value is less than the dark area critical value, the difference value is adjusted to be greater than or equal to the dark area critical value to eliminate a dark area to be shown on the curved liquid crystal display panel; and a processor configured to load and execute the plurality of instructions.

* * * * *